US012592438B2

(12) United States Patent
Liu et al.

(10) Patent No.: US 12,592,438 B2

(45) Date of Patent: Mar. 31, 2026

(54) ELECTRONIC DEVICE AND MANUFACTURING METHOD THEREFOR

(71) Applicant: EVE ENERGY CO., LTD., Guangdong (CN)

(72) Inventors: Liang Liang Liu, Guangdong (CN); Yuan Zhu, Guangdong (CN); Jianhua Liu, Guangdong (CN); Jincheng Liu, Guangdong (CN)

(73) Assignee: EVE ENERGY CO., LTD., Guangdong (CN)

( * ) Notice: Subject to any disclaimer, the term of this patent is extended or adjusted under 35 U.S.C. 154(b) by 394 days.

(21) Appl. No.: 17/793,859

(22) PCT Filed: Sep. 3, 2020

(86) PCT No.: PCT/CN2020/113148

§ 371 (c)(1),
(2) Date: Jul. 19, 2022

(87) PCT Pub. No.: WO2022/032753

PCT Pub. Date: Feb. 17, 2022

(65) Prior Publication Data

US 2023/0216116 A1 Jul. 6, 2023

(30) Foreign Application Priority Data

Aug. 10, 2020 (CN) ......................... 202010797727.2
Aug. 10, 2020 (CN) ......................... 202021647831.5

(51) Int. Cl.
*H01M 50/169* (2021.01)
*H01M 10/0525* (2010.01)
(Continued)

(52) U.S. Cl.
CPC ..... *H01M 50/169* (2021.01); *H01M 10/0525* (2013.01); *H01M 10/0587* (2013.01);
(Continued)

(58) Field of Classification Search
CPC ........... H01M 50/169; H01M 10/0525; H01M 10/0587; H01M 50/107; H01M 50/186;
(Continued)

(56) References Cited

U.S. PATENT DOCUMENTS

2016/0372716 A1* 12/2016 Ahn .................... H01M 50/105

FOREIGN PATENT DOCUMENTS

CN 201066701 Y 5/2008
CN 101983442 A 3/2011
(Continued)

OTHER PUBLICATIONS

English translation of CN-106159350-B (Year: 2019).*
(Continued)

*Primary Examiner* — Ula C Ruddock
*Assistant Examiner* — Sarika Gupta
(74) *Attorney, Agent, or Firm* — HUNTON ANDREWS KURTH LLP

(57) ABSTRACT

Provided are an electronic device and a manufacturing method therefor. The electronic device includes a first housing, a second housing, a cover plate, and a cell. The first housing includes a bottom plate and a first enclosure wall annularly disposed on a side of the bottom plate. The second housing includes a top plate and a second enclosure wall annularly disposed on a side of the top plate. The second enclosure wall is sleeved on an outer side wall of the first enclosure wall. The top plate is provided with an exit hole. The cover plate plugs the exit hole. One of a positive tab or a negative tab of the cell is connected to a part of the cover plate facing the exit hole. The other one of the positive tab or the negative tab is sandwiched between the first enclosure wall and the second enclosure wall.

9 Claims, 4 Drawing Sheets

(51) Int. Cl.
*H01M 10/0587* (2010.01)
*H01M 50/107* (2021.01)
*H01M 50/186* (2021.01)
*H01M 50/193* (2021.01)
*H01M 50/533* (2021.01)
*H01M 50/538* (2021.01)
*H01M 50/645* (2021.01)

(52) U.S. Cl.
CPC ....... *H01M 50/107* (2021.01); *H01M 50/186* (2021.01); *H01M 50/193* (2021.01); *H01M 50/533* (2021.01); *H01M 50/538* (2021.01); *H01M 50/645* (2021.01)

(58) Field of Classification Search
CPC ............. H01M 50/193; H01M 50/533; H01M 50/538; H01M 50/645; H01M 50/103; H01M 50/109; H01M 50/119; H01M 50/153; H01M 50/176; H01M 50/531; H01M 2220/30; H01M 50/536; H01M 50/188; H01M 50/102; H01M 50/55; H01M 50/559; H01M 50/566; Y02E 60/10
See application file for complete search history.

(56) References Cited

FOREIGN PATENT DOCUMENTS

| | | | | |
|---|---|---|---|---|
| CN | 203119037 U | | 8/2013 | |
| CN | 104332647 A | | 2/2015 | |
| CN | 205429098 U | | 8/2016 | |
| CN | 105958109 A | | 9/2016 | |
| CN | 106159350 A | | 11/2016 | |
| CN | 205846146 U | | 12/2016 | |
| CN | 107425145 A | | 12/2017 | |
| CN | 106159350 B | * | 4/2019 | ........ H01M 10/0525 |
| CN | 110336040 A | | 10/2019 | |
| CN | 110797480 A | | 2/2020 | |
| CN | 110854306 A | | 2/2020 | |
| CN | 111162209 A | | 5/2020 | |
| CN | 111211259 A | | 5/2020 | |
| CN | 210576261 U | | 5/2020 | |
| CN | 111354910 A | | 6/2020 | |
| CN | 111370618 A | | 7/2020 | |
| CN | 111370619 A | | 7/2020 | |
| CN | 111370636 A | | 7/2020 | |
| CN | 111416068 A | | 7/2020 | |
| JP | H11273744 A | | 10/1999 | |
| JP | 2019046639 A | | 3/2019 | |
| KR | 20200007560 A | | 1/2020 | |
| KR | 20200020619 A | | 2/2020 | |

OTHER PUBLICATIONS

International Search Report dated Apr. 28, 2021 issued in PCT/CN2020/113148.
Notification to Grant Patent right for Invention dated Mar. 16, 2024 in CN 202010797727.2.
The extended European search report dated Jun. 13, 2024 issued in EP 20949250.3.
Chinese Office Action dated Jun. 6, 2023 issued in CN 202010797727.2.

* cited by examiner

ELECTRONIC DEVICE AND MANUFACTURING METHOD THEREFOR

CROSS-REFERENCE TO RELATED APPLICATION(S)

This is a national stage application filed under 37 U.S.C. 371 based on International Patent Application No. PCT/CN2020/113148, filed Sep. 3, 2020, which claims priority to Chinese Patent Application No. 202010797727.2 filed Aug. 10, 2020 and Chinese Patent Application No. 202021647831.5 filed Aug. 10, 2020, the disclosures of three of which are incorporated herein by reference in their entireties.

TECHNICAL FIELD

The present application relates to the technical field of electronic devices, and relates to, for example, an electronic device and a manufacturing method therefor.

BACKGROUND

A small lithium-ion battery has been widely used in calculators, electronic watches and other electronic products due to its advantages such as a small size, a stable discharge voltage, and a high battery voltage. At present, in common small lithium-ion batteries, a positive electrode housing and a negative electrode housing are often sealed by sides extrusion. A positive tab of a coiled cell and a negative tab of a coiled cell inside the battery are generally respectively drawn out from an upper end of the coiled cell and a lower end of the coiled cell, and are respectively connected to the positive electrode housing and the negative electrode housing. Lithium-ion batteries in the related art have the following defects: 1. sealing by sides extrusion occupies an internal space of a battery inside the housing, resulting in a reduction in a capacity of the battery; 2. sealing by outer diameter extrusion cause a poor sealing reliability due to a large sealing region; 3. sealing by sides extrusion has no explosion-proof function, and the safety of the battery decreases when the sealing performance is good; and 4. the tabs being respectively drawn out from the upper end of the coiled cell and the lower end of the coiled cell, occupy the internal space of the battery.

SUMMARY

The present application provides an electronic device with a simplified structure, a high utilization rate of an internal space, reliable sealing and high safety.

The present application provides a manufacturing method for an electronic device, which is simple to operate and can improve the internal utilization rate of the electrical device and enhance the sealing of the electronic device.

An electronic device provided in an embodiment includes a first housing, a second housing, a cover plate, and a cell.

The first housing includes a bottom plate and a first enclosure wall annularly disposed on a side of the bottom plate.

The second housing includes a top plate and a second enclosure wall annularly disposed on a side of the top plate, where the second enclosure wall is sleeved on an outer side wall of the first enclosure wall, the second enclosure wall is fixedly connected to the first enclosure wall, and the top plate is provided with an exit hole.

The cover plate is insulated from and connected to a side surface of the top plate facing away from the bottom plate, where the cover plate plugs the exit hole.

One of a positive tab or a negative tab of the cell is connected to a part of the cover plate facing the exit hole, and the other one of the positive tab or the negative tab is sandwiched between the first enclosure wall and the second enclosure wall.

A manufacturing method for an electronic device provided in an embodiment is used for manufacturing the electronic device and includes steps described below.

A first housing, a second housing, a cover plate, and a cell are provided so that the cover plate and the second housing are insulated and connected as an upper cover assembly.

One of tabs of the cell is connected to the cover plate.

The cell is assembled in the first housing, and the other one of the tabs of the cell is folded and attached to an outer side wall of a first enclosure wall of the first housing.

The upper cover assembly is assembled with the first housing, and the first enclosure wall and a second enclosure wall of the second housing are welded.

Figure 1:
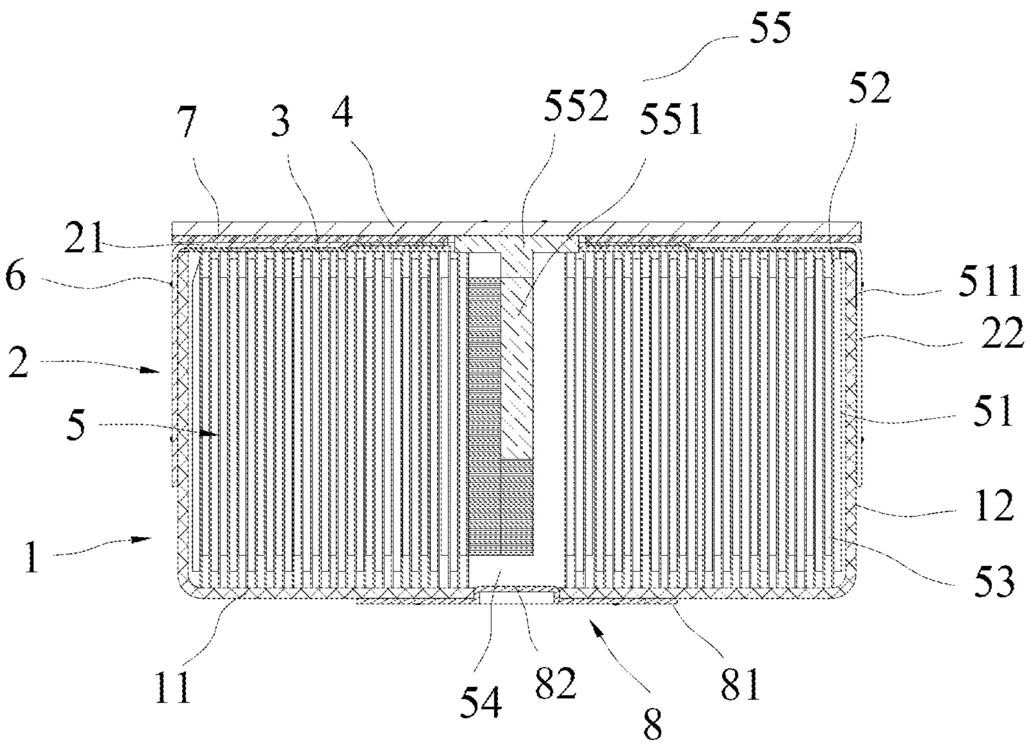
FIG. 1 is a sectional diagram of an electronic device according to an embodiment of the present application.
Figure 2:
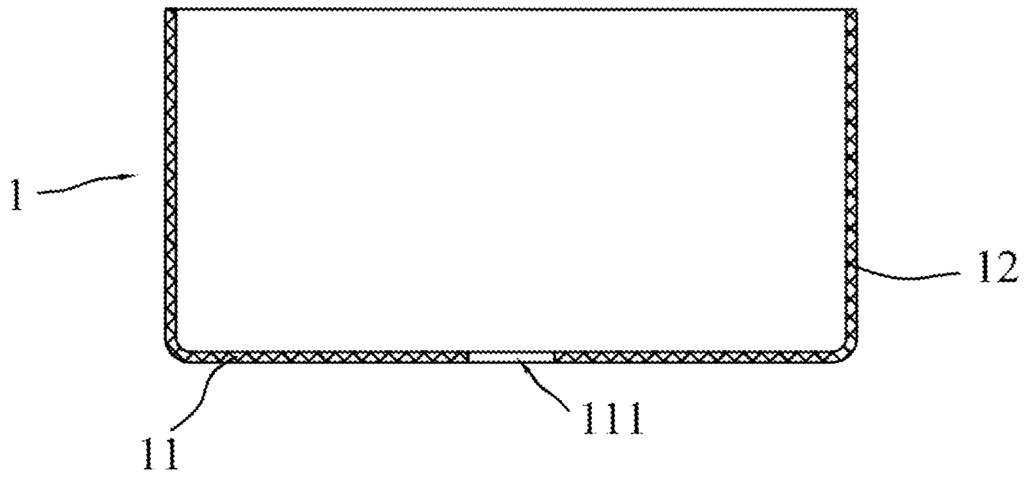
FIG. 2 is a schematic diagram of a first housing according to an embodiment of the present application.
Figure 3:
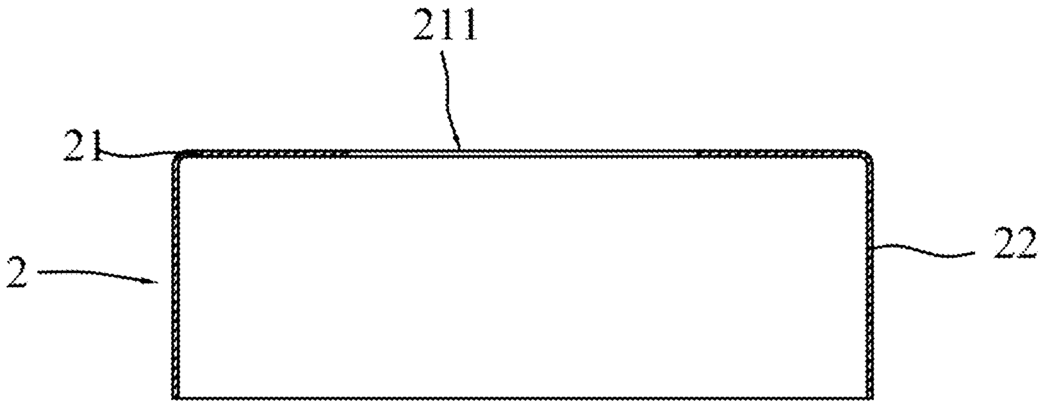
FIG. 3 is a schematic diagram of a second housing according to an embodiment of the present application.
Figure 4:
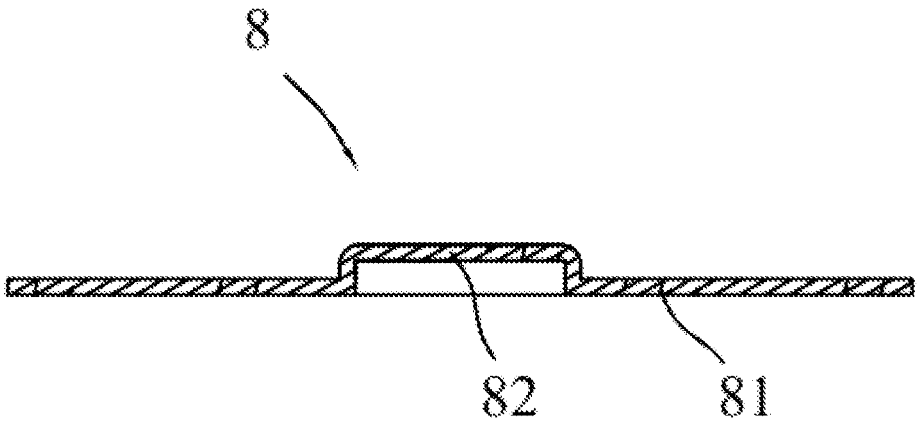
FIG. 4 is a schematic diagram of a plug according to an embodiment of the present application.

| Reference list | |
|---|---|
| 1. | first housing |
| 2. | second housing |
| 3. | insulating layer |
| 4. | cover plate |
| 5. | coiled cell |
| 6. | welding ring |
| 7. | insulating film |
| 8. | plug |
| 11. | bottom plate |
| 12. | first enclosure wall |
| 21. | top plate |
| 22. | second enclosure wall |
| 51. | negative electrode sheet |
| 52. | diaphragm |
| 53. | positive electrode sheet |
| 54. | through hole |
| 55. | positive tab |
| 81. | plug base |
| 82. | plug-in |
| 111. | liquid injection hole |
| 211. | exit hole |
| 511. | negative tab |
| 551. | rod body |
| 552. | connecting plate |

DETAILED DESCRIPTION

In the description of the present application, terms "joined", "connected" and "secured" are to be understood in a broad sense unless otherwise expressly specified and limited. For example, the term “connected” may refer to “securely connected”, “detachably connected” or “integrated”, may refer to “mechanically connected” or “electrically connected” or may refer to “connected directly”, “connected indirectly through an intermediary” or “internal communication between two components” or “interaction relations between two components”. For those of ordinary skill in the art, specific meanings of the preceding terms in the present application may be understood based on specific situations.

In the present application, unless otherwise expressly specified and limited, when a first feature is described as “on” or “below” a second feature, the first feature and the second feature may be in direct contact or be in contact via another feature between the two features instead of being in direct contact. Moreover, when the first feature is described as “on”, “above”, or “over” the second feature, the first feature is right on, above, or over the second feature or the first feature is obliquely on, above, or over the second feature, or the first feature is simply at a higher level than the second feature. When the first feature is described as “under”, “below”, or “underneath” the second feature, the first feature is right under, below; or underneath the second feature or the first feature is obliquely under, below; or underneath the second feature, or the first feature is simply at a lower level than the second feature.

As shown in FIGS. 1 to 7, an electronic device in an embodiment of the present application includes a first housing 1, a second housing 2, a cover plate 4, and a cell. The first housing 1 includes a bottom plate 11 and a first enclosure wall 12 annularly disposed on a side of the bottom plate 11. The second housing 2 includes a top plate 21 and a second enclosure wall 22 annularly disposed on a side of the top plate 21. The second enclosure wall 22 is sleeved on an outer side wall of the first enclosure wall 21. The second enclosure wall 22 is fixedly connected to the first enclosure wall 12. The top plate 21 is provided with an exit hole 211. The cover plate 4 is insulated from and connected to a side surface of the top plate 21 facing away from the bottom plate 11. The cover plate 4 plugs the exit hole 211. One of a positive tab 55 or a negative tab 511 of the cell is connected to a part of the cover plate 4 facing the exit hole 211. The other one of the positive tab 55 or the negative tab 511 is sandwiched between the first enclosure wall 12 and the second enclosure wall 22. The first housing 1 is fixedly connected to the second housing 2, and the cover plate 4 is insulated from and connected to the top plate 21 of the second housing 2 so that the first housing 1 and the second housing 2 does not need to be extruded to effectively seal the electronic device, and an internal space of the housing of the electronic device is not occupied, thereby effectively improving an internal capacity of the electronic device. At the same time, one of the positive tab 55 or the negative tab 511 is sandwiched between the first enclosure wall 12 and the second enclosure wall 22 so that the space on a upper side or a lower side inside the electronic device does not need to be occupied, thereby improving a utilized space inside the electronic device while ensuring a good contact between electrodes and the housing.

The electronic device may be a rechargeable battery (for example, a lithium-ion battery), a non-rechargeable battery (for example, a lithium battery), or a capacitor.

The cell may be a coiled cell 5 or a laminated cell, and the coiled cell 5 is used as an example for illustration in the following.

The coiled cell 5 includes a positive electrode sheet 53 and a negative electrode sheet 51. A diaphragm 52 is disposed between the positive electrode sheet 53 and the negative electrode sheet 51. The positive electrode sheet 53, the diaphragm 52, and the negative electrode sheet 51 are wound to form the coiled cell 5. The negative tab 511 is drawn out from the negative electrode sheet 51 of the coiled cell 5. The negative tab 511 is bent and sandwiched between the first enclosure wall 12 and the second enclosure wall 22.

Optionally, an insulating layer 3 is disposed on an inner side surface of the top plate 21. The insulating layer 3 is disposed so that insulation isolation may be performed between the coiled cell 5 and the top plate 21 of the second housing 2, thereby improving the use safety of the electronic device. In other embodiments, the additional insulating layer 3 is not limited, and it is also feasible that an end of the diaphragm 52 of the coiled cell 5 closer to the top plate 21 extends towards an outside of the coiled cell 5 to form an isolation portion, and the isolation portion forms an insulating structure of the coiled cell 5 and the top plate 21.

In this embodiment, a through hole 54 penetrates through a middle of the coiled cell 5, the positive tab 55 of the cell is disposed in the through hole 54, the positive tab 55 is connected to the positive electrode sheet 53 of the coiled cell 5, and the positive tab 55 passes through the exit hole 211 to be connected to the cover plate 4. The through hole 54 is directly disposed in the coiled cell 5, and the cover plate 4 and the positive electrode sheet 53 are connected through the positive tab 55 so as to draw the current. This design can avoid the tab from being drawn out from an upper end of the coiled cell 5 and occupying a space at the upper end, and at the same time, the arrangement of the positive tab 55 can reduce the difficulty to be connected to the cover plate 4.

Optionally, positions of the positive tab 55 and the negative tab 511 may also be interchanged, that is, the negative tab 511 is disposed in the through hole 54 and connected to the cover plate 4, and the positive tab 55 is sandwiched between the first enclosure wall 12 and the second enclosure wall 22. The case where the positive tab 55 is connected to the cover plate 4, and the negative tab 511 is sandwiched between the first enclosure wall 12 and the second enclosure wall 22 is used as an example for illustration hereinafter.

Exemplarily, the positive tab 55 is welded to the positive electrode sheet 53, the positive tab 55 is welded to the cover plate 4, the negative electrode sheet 51 is connected to the negative tab 511, and the negative tab 511 is bent and sandwiched between the first enclosure wall 12 and the second enclosure wall 22.

The negative tab 511 may be an uncoated current collector (copper foil) or a metal conductor additionally welded on the uncoated current collector.

Figure 5:
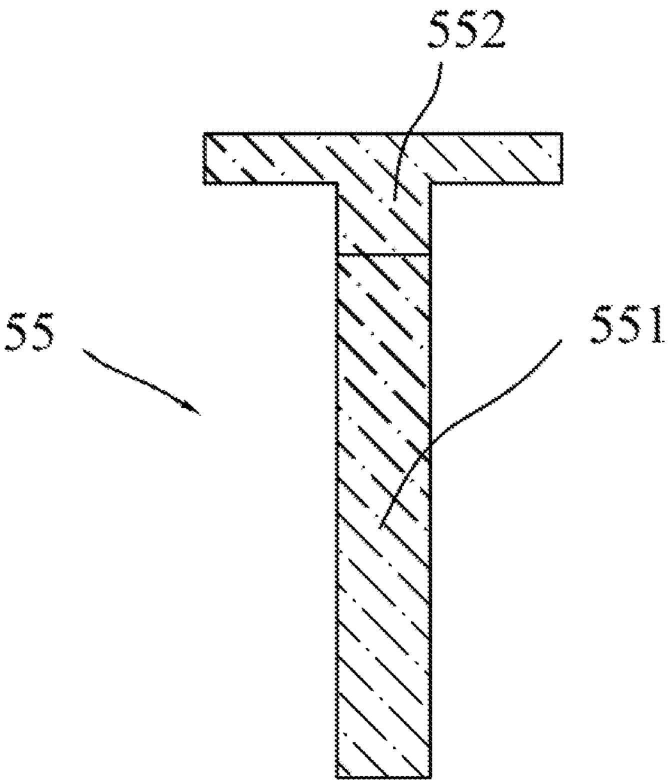
FIG. 5 is a structural diagram of a position tab according to an embodiment of the present application.
Figure 6:
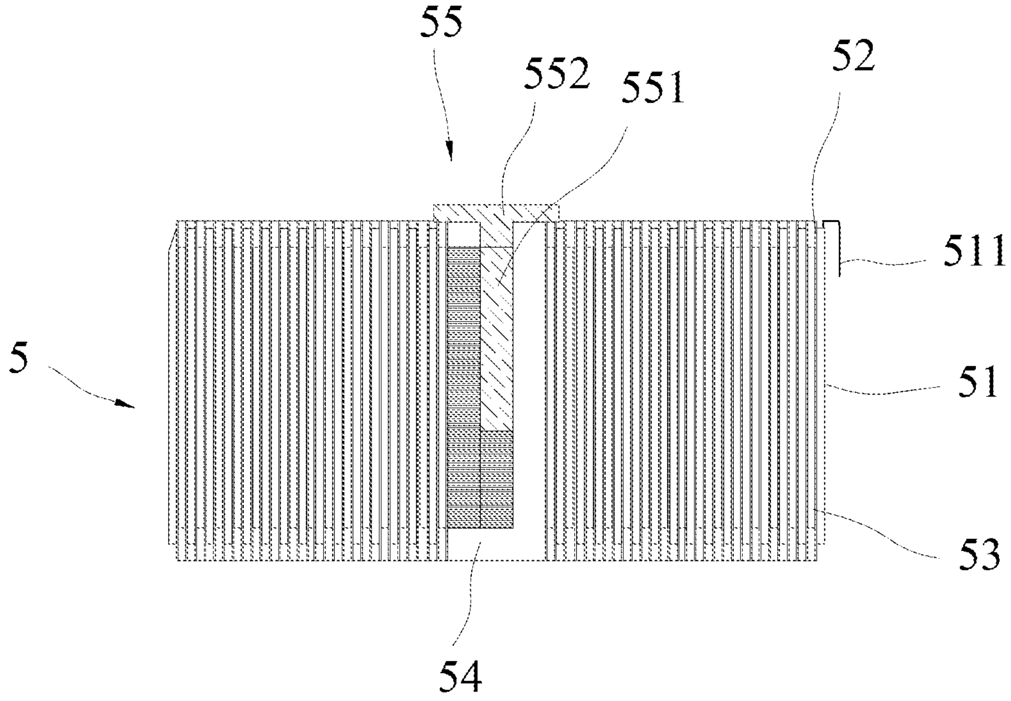
FIG. 6 is a schematic assembling diagram of a positive tab and a coiled cell according to an embodiment of the present application.
Figure 7:
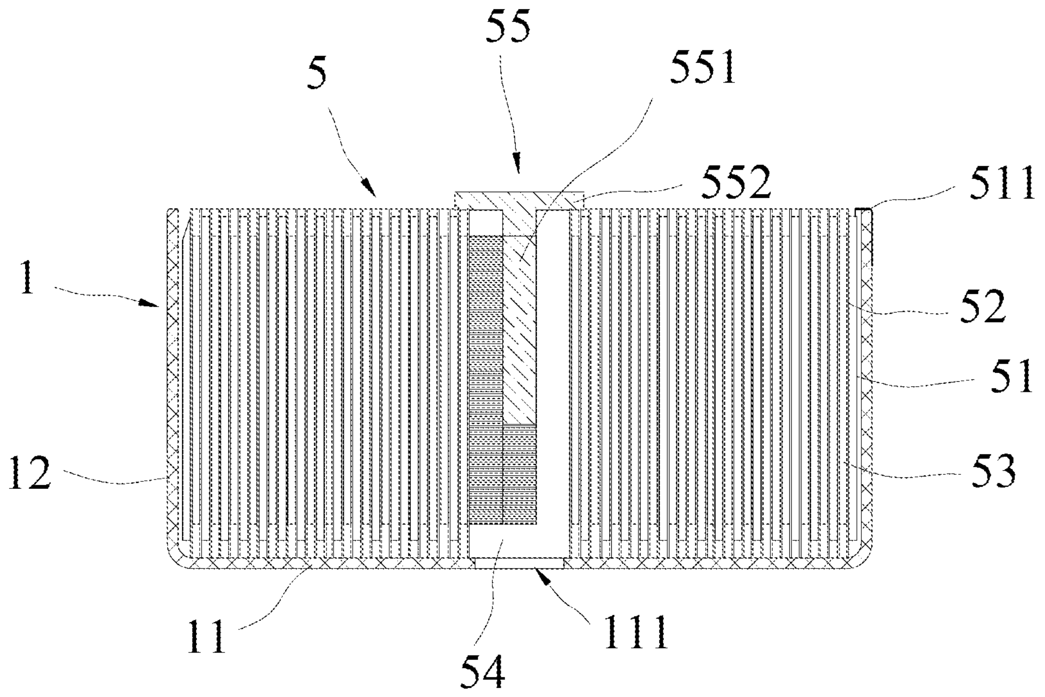
FIG. 7 is a schematic assembling diagram of a positive tab, a coiled cell, and a first housing according to an embodiment of the present application.

In other embodiments, as shown in FIGS. 1 and 5, the positive tab 55 includes a rod body 551, a connecting plate 552 is disposed at an end of the rod body 551 closer to the cover plate 4, the positive electrode sheet 53 or the negative electrode sheet 51 is connected to an outer side wall of the rod body 551, and the connecting plate 552 is connected to the cover plate 4.

Optionally, a sectional dimension of the connecting plate 552 is greater than a sectional dimension of the rod body 551. The connecting plate 552 with a larger sectional dimension is disposed on the rod body 551 so that a connection area between the positive tab 55 and the cover plate 4 may be increased. The sectional dimension of the rod body 551 is relatively small so that while the reliability of the connection is ensured, too much space inside the electronic device would not be occupied, thereby improving the utilization rate of the internal space of the electronic device.

In an embodiment, the second enclosure wall 22 is welded to the first enclosure wall 12, an outer side wall of the second enclosure wall 22 forms an annular welding ring 6, and the negative tab 511 of the coiled cell 5 is located at least partially in a region covered by the welding ring 6. The negative tab 511 is disposed in the region covered by the welding ring 6 so that it can be ensured that the negative tab 511 is welded and fixed between the first enclosure wall 12 and the second enclosure wall 22, thereby ensuring that the position of the negative tab 511 does not shift.

Optionally, at least two circles of welding rings 6 are arranged at intervals on the second enclosure wall 22 along an axial direction of the second enclosure wall 22 so as to enhance the sealing of the electronic device and ensure a good contact between the electrodes and the first enclosure wall 12 and a good contact between the electrodes and the second enclosure wall 22.

In an embodiment, an insulating film 7 is disposed on a side surface of the cover plate 4 facing towards the top plate 21, the insulating film 7 is provided with a by-pass hole corresponding to a connection position of the positive tab 55 of the coiled cell 5, and the insulating film 7 is fixed between the cover plate 4 and the top plate 21 by thermal pressing.

The insulating film 7 is fixed between the cover plate 4 and the top plate 21 by thermal pressing. The method of thermal pressing can not only reduce the manufacturing difficulty, but also improve the insulation connection strength between the cover plate 4 and the top plate 21, thereby effectively preventing the cover plate 4 from being separated from the top plate 21. Since the cover plate 4 has a preset strength, when the temperature and pressure rise, in the case where the sealing strength generated due to thermal sealing between the cover plate 4 and the second housing 2 is constant, the expansion of air inside the electronic device may separate the cover plate 4 from the second housing 2, so that the housing of the electronic device can be opened, to have an explosion-proof function, thereby ensuring the safety of the electronic device in use.

Optionally, the insulating film 7 is any one of or a combination of a PE layer and a PPa layer.

In other embodiments, the insulating film 7 may also be a composite layer structure, that is, the insulating film 7 includes a first adhesive layer and a second adhesive layer arranged at intervals, an intermediate layer is disposed between the first adhesive layer and the second adhesive layer, and at least one of the first adhesive layer or the second adhesive layer is the PE layer or the PPa laver.

The intermediate layer is made of plastics with relatively high temperature resistance and better electrical insulation than those of the PE or the PPa. For example, the intermediate layer may be a PFA layer, a polyethylene naphthalate two formic acid glycol ester (PEN) layer, a polyethylene glycol terephthalate (PET) layer, a polyphenylene sulfide (PPS) layer, and the like.

Polyethylene (PE) is a thermoplastic resin obtained by polymerization of ethylene. In industry, copolymers of ethylene with small amounts of α-olefins are also included. PE is odorless, non-toxic, feels like wax, has excellent low temperature resistance, good chemical stability, and can withstand most acid and alkali erosion. At ambient temperature, PE is insoluble in common solvents and has low water absorption and excellent electrical insulation.

Polypropylene (PP) is a polymer obtained by addition polymerization of propylene, is a white waxy material, has a transparent appearance and a light weight, is flammable, has a melting point of 165° C., softens at about 155° C., and has a service temperature range of −30° C. to 140° C. Modified PP (PPa) is obtained by modification of PP. For example, the modified PP (PPa) used in this embodiment is a metal adhesive polypropylene (hereinafter referred to as modified metal adhesive PP). Chemical modification methods such as copolymerization, grafting or cross-linking are performed on PP so that the surface of PPa has a metal adhesive property so that the surface of PPa may be fused with the metal surface through heating, thereby achieving good bonding seal.

PFA is tetrafluoroethylene-perfluoroalkoxy vinyl ether copolymer (also known as a perfluoroalkyl compound or soluble polytetrafluoroethylene), and is a small amount of copolymer of perfluoropropyl perfluorovinyl ether and polytetrafluoroethylene. The melt adhesion is enhanced, the melt viscosity is reduced, and the performance is unchanged compared with polytetrafluoroethylene. This resin may be directly processed into products by an ordinary thermoplastic molding method. PFA has a long-term service temperature of −200° C. to −260° C., has excellent chemical corrosion resistance, is resistant to all chemicals, has the lowest friction coefficient among plastics, and has good electrical properties. The electrical insulation of PFA is not affected by temperature, and PFA is known as the "king of plastics". The chemical resistance of PFA is similar to and better than the chemical resistance of polytetrafluoroethylene, PFA has better creep resistance and compressive strength than polytetrafluoroethylene, the tensile strength of PFA is high, and the elongation of PFA can reach 100-300%; PFA has a good dielectric property and excellent radiation resistance; PFA has high flame retardancy; PFA is non-toxic and physiologically inert and may be implanted into the human body.

Optionally, the insulating layer 3 is made of the same material as the insulating film 7, and the insulating layer 3 is fixed on a side surface of the top plate 21 facing towards the coiled cell 5 by thermal pressing. The insulating layer 3 is thermally extruded on the top plate 21 of the second housing 2, thereby reducing the difficulty of operation and improving the insulating effect.

Of course, in other embodiments, the insulating layer 3 may also be made of other materials, and the insulating layer 3 is fixed on the side surface of the top plate 21 facing towards the coiled cell 5 by means of adhesive.

In an embodiment, the through hole 54 is provided at and penetrates through the middle of the coiled cell 5, the bottom plate 11 is provided with a liquid injection hole 111 that communicates with the through hole 54, and a plug 8 for plugging the liquid injection hole 111 is disposed at the liquid injection hole 111. The through hole 54 is provided at and penetrates through the middle of the coiled cell 5 and the liquid injection hole 111 is disposed on the bottom plate 11 at a position opposite to the through hole 54 so that no additional by-pass channel is necessary to be provided between the housing and the coiled cell 5, thereby reducing the occupied internal space of the electronic device and reducing the manufacturing difficulty of the electronic device.

Optionally, the plug 8 includes a plug base 81, a plug-in 82 is provided at and protrudes from a side surface of the plug base 81 facing towards the bottom plate 11, the plug-in 82 is plugged into the liquid injection hole 111, and the plug base 81 is fixed on a side surface of the bottom plate 11 facing away from the first enclosure wall 12.

Exemplarily, the plug base 81 is welded on the bottom plate 11.

The method for welding the plug base 81 on the bottom plate 11 is not limited to laser welding, but may also be ultrasonic welding and resistance welding. The plug base 81 is welded from the outside of the housing, thereby reducing the difficulty of operation.

In an embodiment, a thickness of the second housing 2 is smaller than either a thickness of the first housing 1 or a thickness of the cover plate 4. The thickness of the second housing 2 is configured to be smaller than either the thickness of the first housing 1 or the thickness of the cover plate 4 so that when pressure exists inside the electronic device, the second housing 2 may preferentially deform and release pressure.

Exemplarily, an assembly process of the electronic device in an embodiment of the present application is described below.

In S100, the cover plate 4 and the second housing 2 are assembled through the insulating film 7 so as to form an upper cover assembly through thermal pressing.

In S200, an end of the positive electrode sheet 53 is welded to the outer side wall of the rod body 551 of the positive tab 55, and then the positive electrode sheet 53, the diaphragm 52, and the negative electrode sheet 51 are wound so as to form a coiled cell 5. In this case, the rod body 551 is located at a center of the coiled cell 5.

In S300, the positive tab 55 and the upper cover assembly are welded into an assembly.

In S400, the coiled cell 5 with the positive tab 55 is assembled in the first housing 1, and the negative tab 511 of the coiled cell 5 is folded and attached to the outside of the first housing 1; then the upper cover assembly is extruded down and assembled, and the negative tab 511 is located between the first enclosure wall 12 and the second enclosure wall 22 of the second housing 2.

In S500, the second enclosure wall 22 of the second housing 2 is welded to the first enclosure wall 12.

In S600, liquid is injected through the liquid injection hole 111 and is subjected to formation, the plug 8 plugs the liquid injection hole 111, and finally, the plug 8 is welded on the bottom plate 11 of the first housing 1.

In other embodiments, the coiled cell 5 with the positive tab 55 is assembled in the first housing 1, and then the positive tab 55 is welded to the upper cover assembly.

The beneficial effects of embodiments of the present application are as follows: the first housing 1 is fixedly connected to the second housing 2, and the cover plate 4 is insulated from and connected to the top plate 21 of the second housing 2 so that the first housing 1 and the second housing 2 do not need to be extruded to effectively seal the electronic device, and the internal space of the housing of the electronic device is not occupied, thereby effectively improving the internal capacity of the electronic device; at the same time, this connection method makes the cover plate 4 to be opened in a certain condition so that the housing of the electronic device has the explosion-proof function, thereby ensuring the safety of the electronic device in use; one of a positive electrode or a negative electrode is sandwiched between the first enclosure wall 12 and the second enclosure wall 22 so that not only the drawing method of the positive electrode or the negative electrode is simplified, but also good contact between the positive electrode or the negative electrode and the housing is ensured, and the space on upper and lower sides inside the electronic device does not need to be occupied, thereby improving the utilization rate of the internal space of the electronic device.

In the description of the present application, it is to be understood that the orientation or position relationships indicated by terms "above" and the like are the orientation or position relationships shown in the drawings, merely for ease of description and simplifying operations, and these relationships do not indicate or imply that the referred device or component has a specific orientation and is constructed and operated in a specific orientation, and thus it is not to be construed as a limitation to the present application.

In the description of the specification, the description of reference terms "an embodiment" and the like means that specific features, structures, materials or characteristics described in connection with the embodiment are included in at least one embodiment or example of the present application. In the specification, the schematic representation of the preceding terms does not necessarily refer to the same embodiment.

Moreover, it is to be understood that although this specification is described in terms of the embodiments, not each embodiment includes only one independent technical solution. Such description mode of the specification is merely for the sake of clarity, and those skilled in the art should regard the specification as a whole. The technical solutions in the embodiments may also be appropriately combined to form other embodiments which will be understood by those skilled in the art.

What is claimed is:

1. An electronic device, comprising:

a first housing comprising a bottom plate and a first enclosure wall annularly disposed on a side of the bottom plate;

a second housing comprising a top plate and a second enclosure wall annularly disposed on a side of the top plate, wherein the second enclosure wall is sleeved on an outer side wall of the first enclosure wall, the second enclosure wall is fixedly connected to the first enclosure wall, and the top plate is provided with an exit hole;

a cover plate insulated from and connected to a side surface of the top plate facing away from the bottom plate, wherein the cover plate plugs the exit hole; and a cell, wherein one of a positive tab or a negative tab of the cell is connected to a part of the cover plate facing the exit hole, and the other one of the positive tab or the negative tab is sandwiched between the first enclosure wall and the second enclosure wall;

wherein the second enclosure wall is welded to the first enclosure wall, and an outer side wall of the second enclosure wall is formed with an annular welding ring; and wherein the other one of the positive tab or the negative tab sandwiched between the first enclosure wall and the second enclosure wall is located at least partially in a region covered by the annular welding ring.

2. The electronic device of claim 1, wherein the cell is a coiled cell, a through hole is provided at and penetrates through a middle of the coiled cell, and one of the positive tab or the negative tab is disposed in the through hole, connected to a positive electrode sheet or a negative electrode sheet of the coiled cell, and configured to pass through the exit hole to be connected to the cover plate.

3. The electronic device of claim 2, wherein the one of the positive tab or the negative tab disposed in the through hole comprises a rod body, a connecting plate is disposed at an end of the rod body closer to the cover plate, the positive electrode sheet or the negative electrode sheet is connected to an outer side wall of the rod body, and the connecting plate is connected to the cover plate.

4. The electronic device of claim 1, wherein an insulating film is disposed on a side surface of the cover plate facing towards the top plate, the insulating film is provided with a by-pass hole at a position corresponding to a connection position of the cover plate and the positive tab or the negative tab of the cell, and the insulating film is fixed between the cover plate and the top plate by thermal pressing.

5. The electronic device of claim 4, wherein the insulating film is at least one of a polyethylene (PE) layer or a modified metal adhesive polypropylene (PPa) layer; or the insulating film comprises a first adhesive layer and a second adhesive layer arranged at intervals, an intermediate layer is disposed between the first adhesive layer and the second adhesive layer, and at least one of the first adhesive layer or the second adhesive layer is a PE layer or a PPa layer.

6. The electronic device of claim 1, wherein the cell is a coiled cell, a through hole is provided at and penetrates through a middle of the coiled cell, the bottom plate is provided with a liquid injection hole that communicates with the through hole, and a plug for plugging the liquid injection hole is disposed at the liquid injection hole.

7. The electronic device of claim 6, wherein the plug comprises a plug base, a plug-in is provided at and protrudes from a side surface of the plug base facing towards the bottom plate, the plug-in is plugged into the liquid injection hole, and the plug base is fixed on a side surface of the bottom plate facing away from the first enclosure wall.

8. The electronic device of claim 1, wherein a thickness of the second housing is smaller than either a thickness of the first housing or a thickness of the cover plate.

9. A manufacturing method for an electronic device, used for manufacturing the electronic device of claim 1, comprising:

providing a first housing, a second housing, a cover plate, and a cell, wherein the cover plate and the second housing are insulated and connected as an upper cover assembly;

connecting one of tabs of the cell to the cover plate;

assembling the cell in the first housing, and folding and attaching the other one of the tabs of the cell to an outer side wall of a first enclosure wall of the first housing; and assembling the upper cover assembly with the first housing, and welding the first enclosure wall and a second enclosure wall of the second housing.

* * * * *